United States Patent [19]

Kamimura et al.

[11] Patent Number: 5,608,225
[45] Date of Patent: Mar. 4, 1997

[54] FLUORESCENT DETECTING APPARATUS AND METHOD

[75] Inventors: Kunio Kamimura, Osaka-fu; Kunitoshi Ohashi, Kobe; Toshio Oshima, Osaka, all of Japan

[73] Assignees: Hitachi Maxell, Ltd., Osaka-fu; Maxell Seiki, Ltd., Kyoto-fu, both of Japan

[21] Appl. No.: 400,768

[22] Filed: Mar. 8, 1995

[30] Foreign Application Priority Data

Mar. 8, 1994 [JP] Japan .................................. 6-065733

[51] Int. Cl.$^6$ .................................................. G06K 7/10
[52] U.S. Cl. ......................................... 250/458.1; 250/271
[58] Field of Search ................................. 250/271, 458.1, 250/459.1, 461.1

[56] References Cited

U.S. PATENT DOCUMENTS

| | | | |
|---|---|---|---|
| 4,275,299 | 6/1981 | Favre | 250/271 |
| 4,642,526 | 2/1987 | Hopkins | 315/244 |
| 4,983,817 | 1/1991 | Dolash et al. | 235/462 |
| 5,210,411 | 5/1993 | Oshima et al. | 250/271 |
| 5,270,548 | 12/1993 | Steinkamp | 250/461.2 |

FOREIGN PATENT DOCUMENTS

| | | |
|---|---|---|
| 0453599 | 10/1991 | European Pat. Off. . |
| 0454488 | 10/1991 | European Pat. Off. . |
| 0515211 | 11/1992 | European Pat. Off. . |

*Primary Examiner*—Constantine Hannaher

[57] ABSTRACT

A fluorescent light emitted from a marking containing at least one fluorescent substance is detected by illuminating the marking with an exciting light having an intensity that varies at a predetermined cycle, converting a change in intensity of light reflected from a position where the exciting light is irradiated into a varying electric signal and selectively extracting from the converted electric signal, only an electric signal component having a frequency matching with but a phase displaced from, that of a signal component corresponding to light reflected from the marking. A fluorescent detecting apparatus for this purpose includes a light source for irradiating at an irradiating station a marking formed on a medium with rays of light having an intensity that varies cyclically, the marking having at least one fluorescent substance. The apparatus further includes a photo-electric detector for detecting incident rays of light reflected from the irradiating station and converting the rays of light into an electric signal, and a phase detector for extracting from the electric signal respective signal components corresponding to the rays of light reflected from the marking and the medium, respectively.

16 Claims, 3 Drawing Sheets

FLUORESCENT DETECTING APPARATUS AND METHOD

BACKGROUND OF THE INVENTION

1. Field of the Invention

The present invention generally relates to an optoelectric apparatus for, and a method of, detecting the presence or absence of a marking on articles of manufacture such as, for example, commutation tickets, telephone cards, prepaid cards or any other items desired to be detected, verified or identified for any particular purpose. The present invention is particularly applicable where the marking on the articles of manufacture is formed by the use of a printing or inking medium of a kind containing at least one fluorescent substance.

2. Description of the Background Art

Japanese Laid-open Patent Publication No. 5-20512, published in 1993, discloses an optoelectric apparatus for and a method of detecting the site at which a marking is formed by detecting the presence or absence of a fluorescent signal emitted from the marking. More specifically, according to this publication, the marking containing at least one fluorescent substance is first illuminated intermittently to repeatedly excite the fluorescent substance to thereby emit fluorescent light which is subsequently detected during a non-illuminating period. The detected fluorescent light is an indication of the site at which the marking is formed, or the presence of the marking at such particular site.

With the above-described prior art method utilizing the persistent fluorescent signal, it has, however, been found that the fluorescent detecting apparatus tends to be fooled by the presence of an external light of a wavelength matching with or in the vicinity of the wavelength of the fluorescent signal. This is particularly true where the marking is illuminated under an environment in which such an external light is persistent. This results in an erroneous indication. Therefore, in order to avoid the erroneous indication, the conventional fluorescent detecting apparatus requires at least its optical detecting system to be shielded from the external light and is thus limited in application.

The inventors of the present invention have conducted a series of investigations in an attempt to substantially eliminate the inconveniences inherent in the conventional apparatus. In the course of the investigations, the inventors have found that while the relationship between the irradiating light and the resultant fluorescent signal varies in unison with a relationship substantially equivalent to the relation between the voltage, applied to a CR (capacitor and resistor) circuit, and the voltage across the capacitor of the CR circuit, the external disturbing light generally has an intensity which does not vary substantially or fluctuates inconsistently and that utilization of the phase relationship among these signals makes it possible to accurately extract a fluorescent light component out from various light components.

In other words, when the marking containing the fluorescent substance is irradiated by light having its amplitude varying cyclically, the light emanating from the marking contains a background light component reflected from the marking and its surroundings, a fluorescent light component of a frequency equal to that of the background light component, but retarded 45° in phase from that of the background light component, and an external disturbing light component. Accordingly, if the frequency component that is equal to the frequency of the irradiating light is selectively extracted, the fluorescent signal can be isolated from the other light components by the utilization of the difference in phase therebetween.

It has also been found that, considering that the difference in phase between the background light component and the fluorescent signal results from the difference in type of the fluorescent substance used, accurate information on the marking can be obtained if the difference in phase is discriminated. Speaking differently, although formation of the marking of an identical shape with the use of an arbitrarily chosen fluorescent substance should pose no difficulty to any person, it is physically difficult to use a fluorescent substance exactly identical in composition with that used in the marking and, therefore, utilization of the marking containing a particular fluorescent substance as a security marking which may include a marking invisible to the human eyes is effective to avoid the opportunity of making a forgery.

SUMMARY OF THE INVENTION

The present invention is based on the foregoing findings and is intended to provide improved optoelectric fluorescent detecting apparatus and method for accurately detecting the presence or absence of a marking containing at least one fluorescent substance, which can be operated at any place without being substantially affected by the external disturbing light.

Another object of the present invention is to provide the improved optoelectric fluorescent detecting apparatus and method of the type referred to above, which accomplish a stabilized detection of the fluorescent signal even though the fluorescent signal contained in the reflected light is extremely small.

A further object of the present invention is to provide the improved optoelectric apparatus and method of the type referred to above, which can detect the quantity of phase retardation of the fluorescent signal relative to the reflected light so that the difference in type of the fluorescent substance used to form the marking can be utilized as information capable of being displayed with the marking.

A still further object of the present invention is to provide the improved optoelectric apparatus and method of the type referred to above, which are effective to accomplish the accurate detection of the marking regardless of the quantity of the incident light.

In order to accomplish these objects, the present invention in one aspect thereof provides for detecting a fluorescent light emitted from a marking containing at least one fluorescent substance by illuminating the marking with an exciting light having an intensity that varies at a predetermined cycle, converting a change in intensity of light reflected from a position where the exciting light is irradiated, into a varying electric signal, and selectively extracting from the converted electric signal, only an electric signal component having a frequency matching with, but a phase displaced from, that of a signal component corresponding to light reflected from the marking.

The present invention in another aspect thereof also provides a fluorescent detecting apparatus for this purpose including a light source for irradiating an irradiating station, where a marking formed on a medium and containing at least one fluorescent substance is disposed, with rays of light having an intensity that varies cyclically, a photo-electric detector for detecting incident rays of light reflected from the irradiating station and converting said rays of light into an electric signal, and a phase detector for extracting from the electric signal respective signal components corresponding to the rays of light reflected from the marking and the medium, respectively.

Preferably, the exciting light has a predetermined wavelength different from that of a fluorescent light emitted from the marking as a result of excitation of the fluorescent substance. The invention may further comprise an optical filtering step of selectively passing a wavelength component of the fluorescent light from the incident light.

Where the reflected light from the marking and the medium is likely to adversely affect the fluorescent light emitted from the fluorescent substance contained in the marking, arrangement should preferably be made such that a signal substantially matching with the reflected light component is prepared and that a difference between the signal matching with the reflected light component and the converted electric signal is amplified to a predetermined value.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

In describing various preferred embodiments of the present invention, reference will be made to the detection of a fluorescent marking in the form of a bar code formed on a monetary card such as, for example, a cash card. It is, however, to be noted that the present invention is equally applicable to the detection of the fluorescent marking in any form formed on any article of manufacture.

Figure 2:
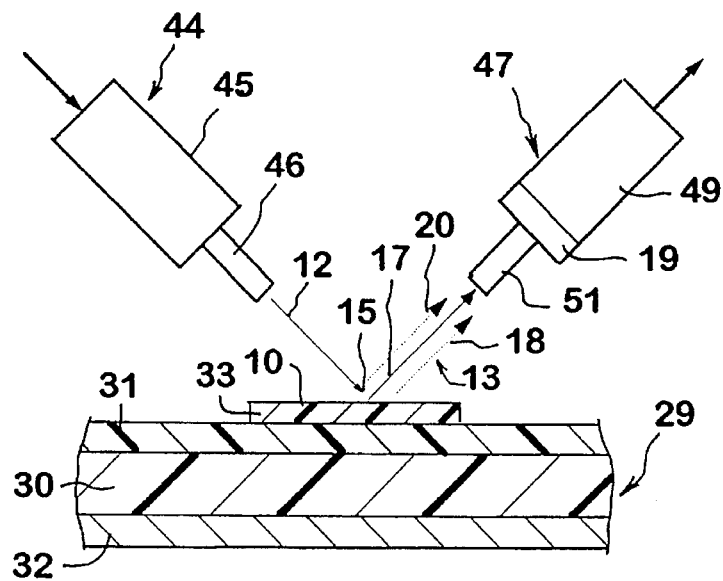
FIG. 2 is an exaggerated side sectional view showing a monetary card having a fluorescent marking to be detected.

Referring first to FIG. 2, the monetary card is generally identified by 29. This monetary card 29 includes a base 30 in the form of a generally oblong white-color film of polyester, an overcoat 31 of any desired design formed by printing on an upper surface of the base 30 and having a controlled light reflectivity, and an undercoat 32 formed on an undersurface of the base 30 on one side of the base 32 opposite to the overcoat 31. In the illustrated embodiment, the undercoat 32 is a rewritable magnetic layer either formed by painting a magnetic paint on the undersurface of the base 30, or bonding any known magnetic recording tape. The overcoat 31 has an outer surface printed with a fluorescent marking 10 containing at least one fluorescent substance.

In the illustrated instance, the marking 10 on the overcoat 31 is comprised of a plurality of fluorescent layers 33 formed by applying a fluorescent paint in a pattern similar to a bar code. Thus, the marking 10 may be regarded as an invisible fluorescent bar code which, when irradiated by an exciting light 12, which may be infrared rays of light, emits a fluorescent signal 18 of a wavelength different from the center wavelength of the exciting light 12. With the fluorescent paint layers 33 of the marking 10 lying perpendicular to the longitudinal axis of the monetary card 29, the marking 10 bears security information including, for example, issuer's identification, bearer's identification and a code number.

The fluorescent paint layers 33 forming the marking 10 are of a composition containing one or a mixture of rare earth elements such as, for example, Nd (neodymium), Yb (ytterbium), Eu (europium), Tm (thulium), Pr (praseodymium) and Dy (dysprosium), as a fluorescent emission center which is mixed in a matrix of, for example, phosphate, molybdate and tungstate. However, in the practice of the present invention, the fluorescent paint layers 33 forming the marking 10 may be of any composition provided that when irradiated by the exciting light of an arbitrarily chosen wavelength, the fluorescent paint layers 33 emit a persistent fluorescent signal.

In the illustrated instance, the fluorescent marking 10 is formed by applying a fluorescent paint containing a fluorescent component such as, for example, $Li(Nd_{0.9}Yb_{0.1})P_4O_{12}$ so that, when it is irradiated by the exciting light 12 of about 800 nm in wavelength, the fluorescent paint layers 33 emit the fluorescent signal 18 having a peak wavelength of about 1,000 nm.

Figure 1:
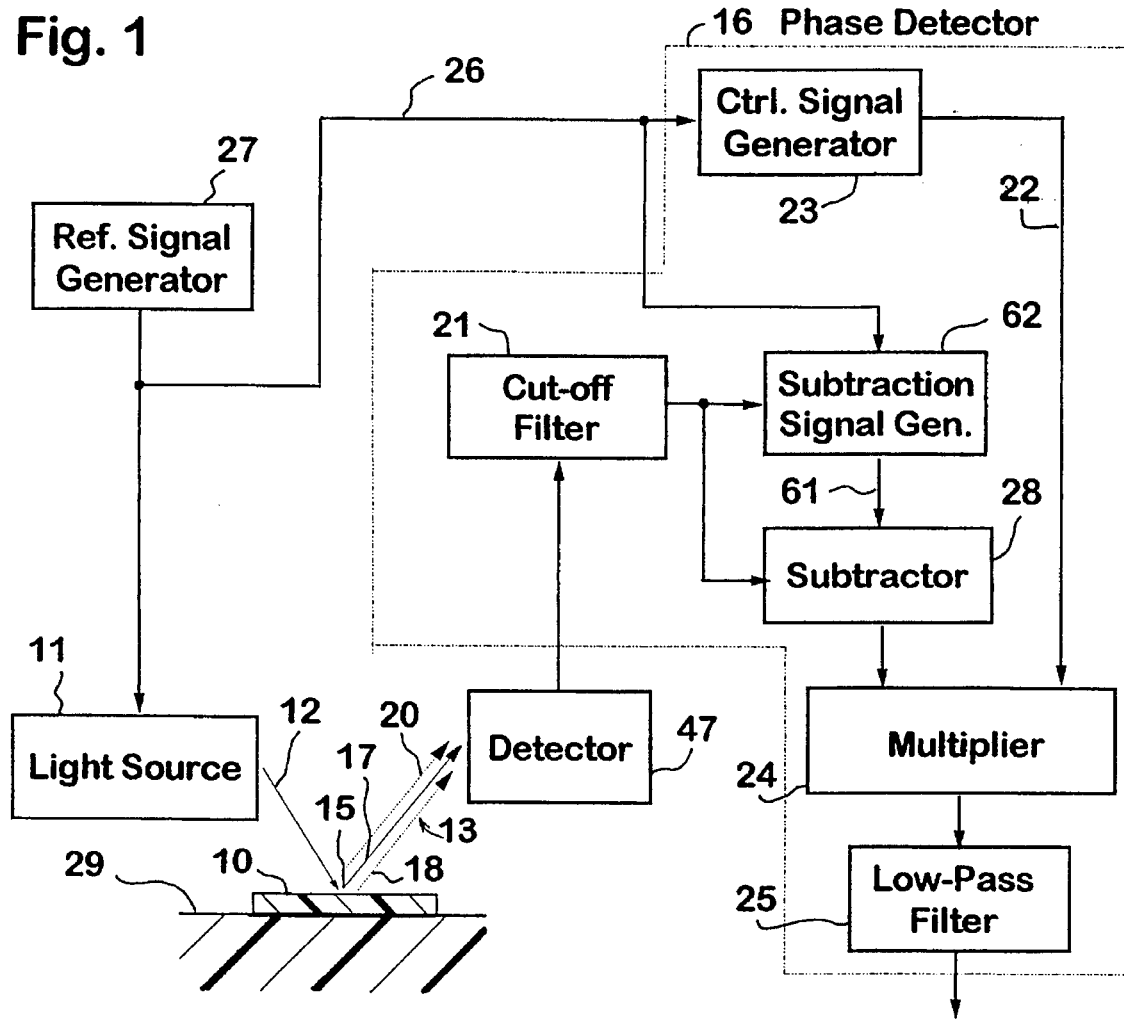
FIG. 1 is a block diagram showing an optoelectric fluorescent detecting apparatus according to a first preferred embodiment of the present invention.

Referring now to FIG. 1, there is shown a fluorescent detecting apparatus according to a first preferred embodiment of the present invention. The fluorescent detecting apparatus shown therein comprises an irradiating light source 11 which may include an illuminator drive circuit (not shown) and an illuminator lamp and which is operable to emit the exciting light of an intensity that cyclically varies in a fashion similar to a sinusoidal alternating current, towards the marking 10 on the monetary card 29. The exciting light 12 scans the marking 10 and, for this purpose, the light source 11 may be supported for movement in one direction where the marking 10 is held still, or may be fixed in position while the marking 10 is moved relative to the light source 11. The apparatus also comprises an photo detector 47 which may include an optical filter, a photoelectric converter and an amplifier, all not shown in FIG. 1. The photo detector 47 is operable to receive rays of light reflected from the marking 10 and convert the received light into an electric signal which is subsequently supplied to a phase detector 16. The phase detector 16 is so designed and so operable as to process the incoming electric signal to selectively extract an electric signal component which is displaced in phase from that of a background signal component corresponding to the intensity of light reflected from the background such as the surface of the monetary card 29, but which has an amplitude varying at a cycle matching with that of the background signal component.

Where the exciting light 12 has a wavelength different from that of the fluorescent signal 18 emitted from the marking 10 when the fluorescent paint layer 33 is excited, the use of an optical filter in the photo detector 47 is preferred since the optical filter can selectively pass therethrough only a fluorescent wavelength component. This optical filter if employed should be disposed in front of an incident window of the photo-electric converter.

The exciting light 12 emitted from the light source 11 has an irradiating intensity power that varies at a frequency higher than external rays of light 20 in a fashion similar to the sinusoidal alternating current. The phase detector 16 includes a low-frequency cut-off filter 21 effective to remove a direct current component associated with the external light 20 from the electric signal emerging from the detector 47, a control signal generator 23 operable to generate a control signal 22 of a phase displaced substantially 90° from that of an electric component of the reflected light 17, a multiplier 24 operable to perform a multiplication between the control signal 22 from the control signal generator 23 and an output signal from the low-frequency cut-off filter 21 operable to cut off a direct current component, and a low-pass filter 25 for selectively extracting a direct current component from an output signal emerging from the multiplier 24.

The phase detector 16 is shown to include a subtraction signal generator 62 connected with the cut-off filter 21 for generating a subtraction signal 61 substantially analogous to the electric component of the reflected light 17 emerging from the cut-off filter 21, and a subtractor 28 operable to perform a subtraction between the subtraction signal 61 and the output signal from the cutoff filter 21. However, the use of the subtraction signal generator 62 and the subtractor 28 may not be always essential and may, if desired, be disposed of as will be described in connection with a second preferred embodiment of the present invention. This is particularly true where the fluorescent light component emitted from the marking 10 has a relatively high intensity.

The two inputs to the multiplier 24 are preferably controlled so as to be of a substantially equal amplitude and, for this purpose, while the amplitude of the control signal 22 is kept constant, the output signal from the cut-off filter 21 may be amplified by an amplifier having an automatic gain control function to render the output signal from the cut-off filter 21 to have an amplitude substantially equal to that of the control signal 22.

The fluorescent detecting apparatus of the above described construction operates in the following manner. Assuming that the marking 10 on the monetary card 29 is irradiated by the exciting light 12 of a power that varies cyclically in a fashion similar to the sinusoidal alternating current, rays of light 13 reflected so as to be incident on the detector 47 include a reflected light component 17, a fluorescent light component 18 and an external light component 20 all mixed up. Of the reflected light 13, the optical filter of the detector 47 selects only the fluorescent light component 18 which is then incident on the photo-electric converter of the photo detector 47. The detector 47 outputs an electric signal indicative of the fluorescent light component 18.

The phase detector 16 makes use of the difference in phase between the reflected light component 17 and the fluorescent light component 18 to separate them from each other. In other words, the external light component 20 is attenuated by the cut-off filter 21. The subtraction signal generator 62 generates a subtraction signal 61 substantially analogous to the reflected light component 17, and the subtractor 28 provides the difference between the input signal from the cut-off filter 21 and the subtraction signal 61 to thereby attenuate the reflected light component 17.

The control signal generator 23 provides a control signal 22 having a phase 90° displaced from that of the reflected light component 17, and the control signal 22 entering the multiplier 24 is multiplied by the difference between the output of the cut-off filter 21 and the subtraction signal 61. Multiplication performed by the multiplier 24 results in an output signal from the multiplier 24 which is a combination of an alternating current component and a direct current component proportional to the fluorescent light component 18. Accordingly, when the output signal from the multiplier 24 passes through the low-pass filter 25, only the alternating current component contained in such output signal is removed, allowing the direct current component to pass therethrough. This direct current component provides an indication of the presence of the marking 10.

As hereinabove described, since the fluorescent detecting apparatus is so designed wherein the irradiating light 12 of an intensity that varies cyclically in an alternating fashion is utilized and the reflected light component 17 and the fluorescent light component 18 are selectively extracted so that the difference in phase between the light components 17 and 18 is utilized to isolate the fluorescent light component 18, the apparatus can advantageously be utilized to accurately detect the light component emanating from the marking 10 containing the fluorescent substance without being adversely affected by surroundings.

Also, detection of the quantity of retardation in phase of the fluorescent light component 18 from the phase of the reflected light component 17 makes it possible to utilize the difference in type of the fluorescent substance forming the marking 10 as information that can be displayed by the marking. Therefore, where the marking is used as a security marking, it is possible to avoid the opportunity of making a forgery.

Moreover, control of the level of each of the signals inputted to the multiplier 24 to a substantially constant value regardless of change in detecting conditions makes it possible to accomplish an accurate detection regardless of the surface condition of the monetary card 29 and/or the distance between the detector and the marking.

Figure 3:
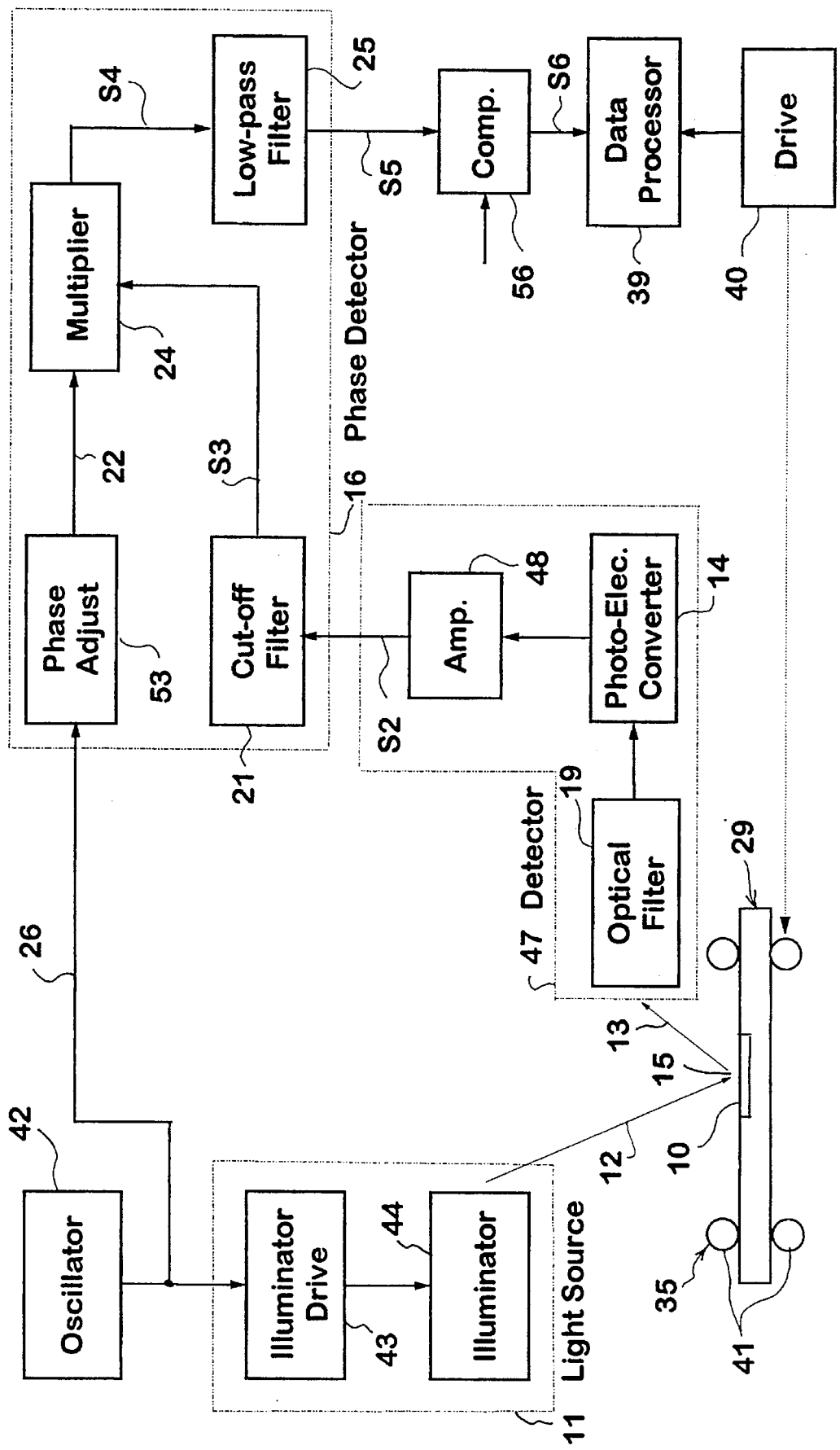
FIG. 3 is a diagram similar to FIG. 1, showing a second preferred embodiment of the present invention.

The fluorescent detecting apparatus according to a second preferred embodiment of the present invention will now be described with reference to FIG. 3. It is to be noted that the apparatus shown in FIG. 3 is substantially similar to FIG. 1 except that neither the subtractor 28 nor the subtraction signal generator 62 are employed. As briefly mentioned in the foregoing description, the use of the subtraction signal generator 62 and the subtractor 28 shown in FIG. 1 may be dispensed with when the fluorescent light component is of a relatively high intensity. The fluorescent detecting apparatus in which neither the subtraction signal generator 62 nor the subtractor 28 are used is shown in FIG. 3. It is, however, to be noted that in FIG. 3, the monetary card 29 is shown to be moved relative to the light source by means of a transport system 35 so that the marking 10 on the monetary card 29 can be scanned by the exciting light 12. It is also to be noted that the light source 11 is shown as comprising an illuminator drive circuit 43 and an illuminator 44 and that the photo detector 47 is shown as comprising the optical filter 19, the photo-electric converter 14 and an amplifier 48.

Referring now to FIG. 3, the card transport system 35 which may be of any known design includes two trains of roller pairs 41 for transporting the monetary card 29 in one direction at a predetermined speed while sandwiching opposite side edge portion of such monetary card 29. This card transport system 35 is so designed and so positioned that the fluorescent marking 10 on the monetary card 29 being transported thereby can be scanned by the exciting light 12 emitted from the light source 11. The transport system 35 is driven by a motor drive circuit 40 at a timing matching with the timing at which the monetary card 29 is inserted onto the transport system 35. The motor drive circuit 40 is coupled with a data processor 39 to provide it with information concerning the operating timing of the motor drive circuit 40 so that the data processor 39 is instructed to initiate a data processing necessary to identify the information carried by the monetary card 29.

The light source 11 shown in FIG. 3 comprises an illuminator drive circuit 43 adapted to receive a sinusoidal reference signal 26 of a predetermined frequency generated from an oscillator 42 and operable to amplify the power of the reference signal 26, and an illuminator 44 for emitting the exciting light as driven by the illuminator drive circuit 43.

As best shown in FIG. 2, the illuminator 44 includes a light emitting element 45 such as, for example, a light emitting diode, of a type capable of emitting the infrared rays of light of a center wavelength in a region of about 800 nm, which element 45 has a light exit window coupled with a light guide 46 in the form of an optical glass fiber. This illuminator 44 is so positioned above the path of movement of the monetary card 29 with a distal end of the light guide 46 spaced from the surface of the monetary card 29 a predetermined distance which may be 2 mm or smaller. The light guide 46 is preferably inclined relative to the surface of the monetary card 29 so that the exciting light 12 emerging outwardly from the light guide 46 can impinge upon the marking 10 at an angle of incidence within the range of 45° to 60°.

The oscillator 42 is preferably of a type capable of generating the sinusoidal alternating voltage signal 26 having a frequency of oscillation of, for example, 1 kHz. The reference signal 26 when supplied to the illuminator drive circuit 43 is added with a direct current voltage of a value substantially higher than the amplitude of the reference signal 26 to render it to be a pulsating signal appropriate to the light emitting element 35 having a directionality with respect to the flow of an electric current such as exhibited by a light emitting diode. The illuminator drive circuit 43 also serves to amplify the electric current of the pulsating reference signal before the latter is supplied to the illuminator 44 to drive the latter. Because of this circuit design, the exciting light 12 emitted from the light source 11 and incident on the monetary card 29 being transported past the irradiating station 15 has an intensity that varies in a sinusoidal fashion at a predetermined wavelength.

The photo detector 47 for converting the incident reflected light 13 into an electric signal comprises the optical filter 19, the photo-electric converter 14 for converting the incident reflected light 13 into a varying electric current and the amplifier 48 for, after the varying electric current has been converted into a varying electric voltage, amplifying the varying electric voltage to a predetermined higher value. As best shown in FIG. 2, the detector 47 includes a light receiving element 49 such as, for example, a photodiode or a photo-cell sensitive to the infrared region of light, which element 49 has a light receiving window coupled with a light guide 51 through the optical filter 19. The light guide 51 is similar to or identical with the light guide 46 used in the illuminator 44. As is the case with the foregoing embodiment, the optical filter 19 is of a type capable of selectively passing therethrough the wavelength of the fluorescent light component 18 emitted from the marking 10.

Also, as is the case with the light guide 46, the light guide 51 is positioned adjacent the light guide 46 and above the path of movement of the monetary card 29 and is preferably inclined at an angle within the range of 105° to 115°, i.e., at an angle required for the light guide 51 to receive the reflected light 13 emerging from the marking 10 at an angle of emergence within the range of 65 to 75° The reflected light 13 entering the light guide 51 are subsequently converted by the light receiving element 49 into an electric current proportional to the intensity of the reflected light 13, which electric current is subsequently amplified by the amplifier 48 to a predetermined voltage. The amplified voltage is subsequently supplied to the phase detector 16 where only a signal indicative of the position of the marking 10 is selected as will be subsequently described.

The electric signal S2 supplied from the amplifier 48 to the phase detector 16 includes a signal component, $Y \cdot \sin\omega t$, indicative of the reflected light 17, a signal component, $X \cdot \sin(\omega t - \theta)$, indicative of the fluorescent light component 18, a signal component, $B \cdot \sin\omega' t$, indicative of the external light component 20, and a direct current component D of the external light 20 all mixed up. It is to be noted that $\omega$ represents the angular frequency of the oscillator, t represents time, Y represents the maximum amplitude, $\theta$ represents the phase displacement resulting from conversion of the reflected light and the fluorescent light into the respective electric signal components, X represents the maximum amplitude, $\omega'$ represents the angular frequency of the external light, and B represents the maximum amplitude.

Multiplication of the signal S2 by $Z \cdot \cos\omega t$ (Z being the maximum amplitude), i.e., the control signal 22 which is a sinusoidal signal having a phase displaced 90° from that of the reflected light component 17, results in $Z/2 \cdot [Y \cdot \sin 2\omega t + X \cdot \sin(2\omega t - \theta) - X \cdot \sin\theta + B\{\sin(\omega + \omega')t - X \cdot \sin(\omega - \omega')t\} + D \cdot \cos\omega t]$. Accordingly, by selectively extracting a direct current or a similar component through a low-pass filter, all of the terms containing $\omega$ in the above equation can be removed, leaving the term $ZX/2 \cdot \sin\theta$. In this equation, Z represents the maximum amplitude of the control signal 22 and is of a predetermined value which therefore corresponds to the value of the fluorescent light component 18.

Thus, according to the second preferred embodiment of the present invention, the fluorescent detecting apparatus is characterized in that the phase relationship among the above described signals is utilized to selectively extract only the signal component proportional to the fluorescent light component 18 from the input electric signal.

In other words, the cut-off filter 21 to which the signal S2 from the amplifier 48 is supplied outputs a signal S3 which corresponds to a signal in which a direct current component of the external light 20 has been sufficiently suppressed. The multiplier 24 multiplies the output signal S3 by the control signal 22 which is formed by passing the output from the oscillator 42 through a phase adjusting circuit 53 and then outputs a signal S4 which is subsequently passed through the low-pass filter 25. The low-pass filter 25 serves to selectively extract a direct current component from the signal S4 to produce an output signal S5. The output signal S5 is then compared by a comparator 56 with a predetermined value so that an output signal S6 can be outputted from the comparator 56 in synchronism with the inputting of the fluorescent light component 18.

It is to be noted that the low-pass filter 25 used in the second preferred embodiment of the present invention serves to avoid passage of a direct current component or a pulsating component of a relatively low frequency of the external light 20 having passed through the optical filter 19. However, if the reference signal 26 of the oscillating frequency is chosen to be higher than a primary frequency component of change in amplitude of the external light component 20 and a filter of a band-pass type is preferably used in place of the low-pass filter to selectively pass the oscillating frequency, removal of the unnecessary component can be enhanced accurately.

On the other hand, the phase adjusting circuit 53, employed in place of the control signal generator 23 used in the first preferred embodiment of the present invention, is adapted to receive the reference signal 26 from the oscillator 42 and to output to the multiplier 24 the control signal 22 which corresponds to the reference signal 26 of which phase has been changed with no frequency thereof altered. In practice, the phase adjusting circuit 53 is finely adjusted beforehand so that the output signal therefrom may have a phase displaced about 90° from that of the reflected light component 17 contained in the output signal S3 from the cut-off filter 21. In other words, in order to minimize the amount of detection when a white-color surface where no marking 10 is formed is detected, the phase of the control signal 22 is adjusted.

The multiplier 24 continuously multiplies two types of the electric signals having their respective amplitude varying sinusoidally, over four quadrants to produce an analog electric signal S4. This output signal S4 contains an alternating current component superimposed on a direct current component corresponding to the fluorescent light component 18 as can readily be understood from the previously discussed equation. Therefore, the output signal S4 from the multiplier 24 is passed through the low-pass filter 25 to extract the direct current component or a similar pulsating component so that a signal S5 having an output voltage abruptly increasing in response to passage of the marking 10 relative to the exciting light 12 from the light source 11 can be obtained.

The amplifier 48 is preferably of a type having an automatic gain control function so that the two inputs to the multiplier 24 can be controlled so as to be of a substantially equal amplitude. The use of the amplifier having the automatic gain control function makes it possible that regardless of surface conditions of the monetary card 29 and/or change in distance between the card 29 and the detector, the two inputs to the multiplier 24 can have a substantially equal magnitude, thereby avoiding the possibility that the detecting sensitivity may be lowered which would otherwise occur if the signal is too low and/or that any possible erroneous operation would occur as a result of waveform distortion which would occur if the signal is too high, thereby ensuring a stabilized detecting operation.

The output signal from the low-pass filter 25 is subsequently supplied to a comparator 56 utilizing an operational amplifier (not shown). In this comparator 56, the signal S5 is compared with a comparing voltage obtained by dividing a voltage, stabilized by a constant voltage diode, by means of a variable resistor. If the comparator 56 determines that the signal S5 is significantly higher than the comparing voltage, the comparator 56 outputs a high level signal S6 indicative of the detection of the position of the marking 10. The data processor 39 which may make use of a microcomputer performs, upon receipt of the high level signal S6 from the comparator 56, a predetermined signal processing such as detection of the width or number of the high level signal S6 to thereby perform a determination of data contents constituted by the marking 10.

By way of example, while in practice of the conventional marking detecting method in which the persistent light is utilized, erroneous operation has occurred under the influence of incandescent light of about 200 Lux, the second preferred embodiment of the present invention has been found satisfactory in that the fluorescent light component 18 could be isolated even when the external light 20 of 3,000 Lux or higher is present at the irradiating station.

Figure 4:
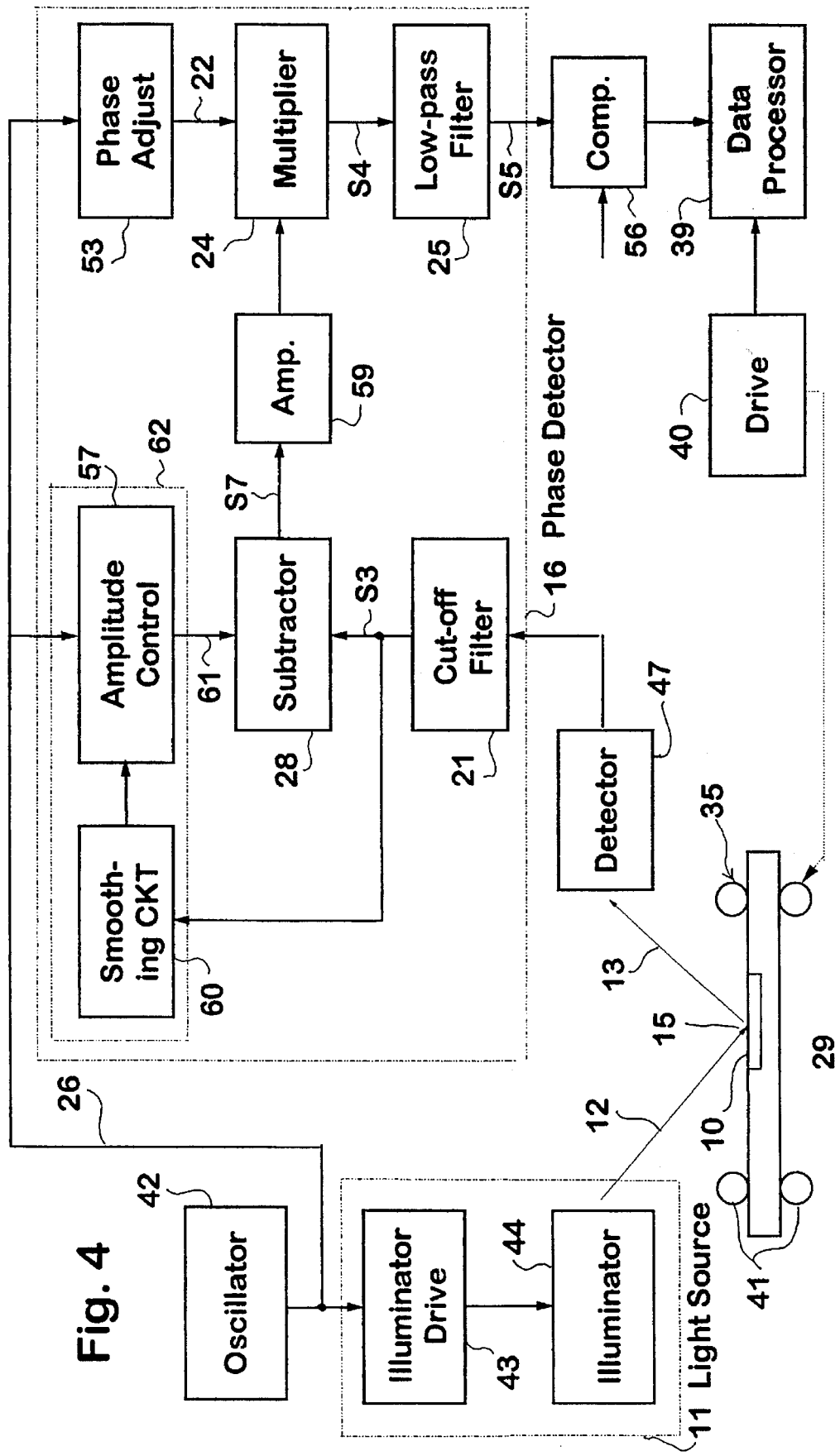
FIG. 4 is a diagram similar to FIG. 1, showing a third preferred embodiment of the present invention.

The fluorescent detecting apparatus according to a third preferred embodiment of the present invention is shown in FIG. 4. The apparatus shown therein is substantially similar to that shown in FIG. 1, except that in place of the subtraction signal generator 62 shown in FIG. 1, a combination of a rectifying smoothing circuit 60 and an amplitude control 57 is employed.

If the exciting light 12 has a wavelength generally close to the wavelength of the fluorescent light component 18, it may be difficult to sufficiently attenuate the reflected light component 17 even though the optical filter 19 is employed. The third preferred embodiment is so designed as to accomplish a stabilized detection of the position of the marking 10 even though the fluorescent light component 18 has a wavelength which is within a few percent wavelengths relative to the reflected light 13 incident upon the detector 47. For this purpose, according to the third preferred embodiment of the present invention, a combination of a rectifying smoothing circuit 60 and an amplitude control 57 is employed in place of the subtraction signal generator 62 shown in FIG. 1.

Referring now to FIG. 4, the amplitude control circuit 57 is operable to make use of the reference signal 26 from the oscillator 42 to produce the subtraction signal 61 of a phase matching with that of the reflected light component 17. This subtraction signal 61 is supplied to the subtractor 28 which subtracts the reflected light component 17 from the signal S3 from the cut-off filter 21 to thereby selectively attenuate only the reflected light component 17 in the reflected light 13. The output signal S7 emerging from the subtractor 28 has an amplitude that is subsequently amplified by an amplifier 59 to a required value.

The intensity of the reflected light 17 varies considerably with a difference in reflectance of a portion of the overcoat 31 in the vicinity of the position of the marking 10. Accordingly, in the third preferred embodiment of the present invention, the output signal S3 from the low-frequency cut-off filter 21 is supplied to a rectifying smoothing circuit 60 so that a change in amplitude of the reflected light component 17 can be automatically detected. This smoothing circuit 60 outputs a detection signal which is subsequently utilized to control the amplitude of the subtraction signal 61 that is outputted from the amplitude control circuit 57, whereby the amplitude of the reflected light component 17 contained in the signal S7 outputted from the subtraction circuit 28 can be kept at a predetermined value substantially equal to the amplitude of the fluorescent light component 18.

According to the third preferred embodiment of the present invention, even though the fluorescent light component is of a quantity which is 10% or lower of the reflected light component 17, it has been confirmed that the fluorescent light component 18 could have been increased to 50%.

It is to be noted that the mark detecting block or phase detector 16 described with reference to the drawings is only for the purpose of illustration and may be of any desired design, provided that the fact that the reflected light component 17 and the fluorescent light 18 are of the same frequency, but differ in phase from each other is utilized to isolate the fluorescent light component 18 from the incident light 13.

By way of example, where the external light component 20 or the reflected light component 17 can be attenuated to a negligible value as compared with the fluorescent light component 18 by the cut-off filter 21 or the subtractor 28, respectively, removal of the reflected light component 17 in which the multiplier 24 is used can be dispensed with. If the reflectance of the marking 10 is chosen beforehand that the reflected light 17 gives rise to a predetermined intensity, it can be set to a predetermined value without the amplitude of the subtraction signal 61 being controlled.

Also, if the displacement in phase between the reflected light component 17 and the fluorescent light component 18 is accurately determined in the comparator 56 in addition to detection of the presence or absence of a composition of the fluorescent light 18, the type of the fluorescent material used in the marking 10 can be determined.

In describing any one of the foregoing embodiments of the present invention, the reference signal 26 generated from the oscillator 42 has been described as a sinusoidal alternating current. However, even where the reference signal 26 may be of any other waveform such as, for example, a rectangular wave or a sawtooth wave, the fluorescent light 18 gives rise to distortion in phase or waveform relative to the reflected light 17. Accordingly, if this distortion is utilized, isolation of the fluorescent light 18 from the reflected light 17 can be achieved in a manner similar to any one of the foregoing embodiments of the present invention.

Again, in describing any one of the foregoing embodiments of the present invention, the monetary card 29 has been described as moved relative to the light source. Where the light source is supported for movement relative to the monetary card 29, the illuminator and the detector may be assembled into a portable probe which may be either manually or automatically moved relative to the monetary card to scan the latter. Alternatively, only the light guide forming a part of the illuminator may be supported for movement relative to the monetary card held at a predetermined position.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method of detecting a fluorescent light emitted from a marking containing at least one fluorescent substance, the method comprising the steps of:

illuminating the marking with an exciting light having an intensity that varies at a predetermined cycle;

converting a change in intensity of light reflected from a position where the exciting light is irradiated, into a varying electric signal; and phase detecting the converted electric signal to selectively extract only an electric signal component having a frequency matching with, but a phase displaced from, that of a signal component corresponding to light reflected from the marking.

2. The method as claimed in claim 1, wherein the exciting light has a predetermined wavelength different from that of a fluorescent light emitted from the marking as a result of excitation of the fluorescent substance, the method further comprising the step of:

optically filtering light from the position where the exciting light is irradiated to selectively pass a wavelength component of the fluorescent light, said step of optically filtering being carried out prior to said step of converting.

3. The method as claimed in claim 2, wherein a component of light reflected from the marking and a medium on which the marking is formed has an amplitude sufficiently higher than a component of the fluorescent light emitted from the marking as a result of excitation of the fluorescent substance, the method further comprising the steps of:

providing a signal substantially matching the reflected light component;

extracting a difference between the signal matching the reflected light component and the converted electric signal; and amplifying the extracted difference to a predetermined value before said step of phase detecting.

4. The method as claimed in claim 2, wherein said step of phase detecting comprises outputting the selectively extracted electric signal component having phase displaced from the reflected light component.

5. The method as claimed in claim 1, wherein a component of light reflected from the marking and a medium on which the marking is formed has an amplitude sufficiently higher than a component of the fluorescent light emitted from the marking as a result of excitation of the fluorescent substance, the method further comprising the steps of:

providing a signal substantially matching the reflected light component;

extracting a difference between the signal matching the reflected light component and the converted electric signal; and amplifying the extracted difference to a predetermined value before said step of phase detecting.

6. The method as claimed in claim 5, wherein said step of phase detecting comprises outputting the selectively extracted electric signal component having phase displaced from the reflected light component.

7. The method as claimed in claim 1, wherein said step of phase detecting comprises outputting the selectively extracted electric signal component having phase displaced from the reflected light component.

8. A fluorescent detecting apparatus comprising:

a light source for irradiating an irradiating station, where a marking formed on a medium and containing at least one fluorescent substance is disposed, with rays of light having an intensity that varies cyclically;

photo-electric detecting means for detecting incident rays of light reflected from the irradiating station and converting the incident rays of light into an electric signal; and a phase detector for extracting from the electric signal respective signal components having a frequency matching with, but a phase displaced from, a signal component corresponding to rays of light reflected from the marking and the medium, respectively.

9. The fluorescent detecting apparatus as claimed in claim 8, wherein the irradiating light has a wavelength different from that of a fluorescent light emitted from the marking, further comprising:

an optical filter disposed at an incident window of said photo-electric detecting means for selectively extracting from the incident rays of light a wavelength component corresponding to the fluorescent light.

10. The fluorescent detecting apparatus as claimed in claim 9, wherein the irradiating light has an intensity that varies sinusoidally at a frequency higher than that of an external light, said phase comprising:

a multiplier for multiplying the electric signal from said photo-electric detecting means by a control signal of a phase displaced substantially 90° from the signal components corresponding to the reflected light from the marking and the medium and a filter for allowing a low-frequency component of an output of said multiplier therethrough.

11. The fluorescent detecting apparatus as claimed in claim 9, wherein the irradiating light has an intensity that varies sinusoidally at a frequency higher than that of a change of an external light, said phase detector comprising:

a low-frequency cut-off filter for removing a component of the external light from the electric signal;

a subtraction signal generator for producing a subtraction signal substantially identical to a component of the reflected light contained in an output signal of said low-frequency cut-off filter;

subtracting means for subtracting the subtraction signal from an output of said low-frequency cut-off filter;

a control signal generator for creating a control signal having a phase displaced substantially 90° from that of the component of the reflected light;

a multiplier for multiplying an output signal from said subtracting means by the control signal; and a low-pass filter for selectively extracting a low-frequency component from an output signal of said multiplier.

12. The fluorescent detecting apparatus as claimed in claim 8, wherein the irradiating light has an intensity that varies sinusoidally at a frequency higher than that of an external light, said phase detector comprising:

a multiplier for multiplying the electric signal from said photo-electric detecting means by a control signal of a phase displaced substantially 90° from the signal components corresponding to the reflected light from the marking and the medium; and a filter for allowing a low-frequency component of an output of said multiplier therethrough.

13. The fluorescent detecting apparatus as claimed in claim 12, wherein the two signals supplied to said multiplier are controlled to have a substantially equal amplitude.

14. The fluorescent detecting apparatus as claimed in claim 13, wherein control of the amplitude of the signals supplied to said multiplier to have substantially equal amplitude is carried out wherein the amplitude of the control signal is maintained at a predetermined value, the fluorescent detecting apparatus further comprising:

amplifying means having an automatic gain control function for amplifying the electric signal prior to extracting by said phase detector.

15. A fluorescent detecting apparatus comprising:

a light source for irradiating an irradiating station, where a marking formed on a medium and containing at least one fluorescent substance is disposed, with rays of light having an intensity that varies cyclically;

photo-electric detecting means for detecting incident rays of light reflected from the irradiating station and converting the incident rays of light into an electric signal; and a phase detector for extracting from the electric signal respective signal components corresponding to rays of light reflected from the marking and the medium, respectively, the irradiating light having an intensity that varies sinusoidally at a frequency higher than that of a change of an external light, said phase detector including a low-frequency cut-off filter for removing a component of the external light from the electric signal, a subtraction signal generator for producing a subtraction signal substantially identical to a component of the reflected light contained in an output signal of said low-frequency cut-off filter, subtracting means for subtracting the subtraction signal from an output of said low-frequency cut-off filter, a control signal generator for creating a control signal having a phase displaced substantially 90° from that of the component of the reflected light, a multiplier for multiplying an output signal from said subtracting means by the control signal, and a low-pass filter for selectively extracting a low-frequency component from an output signal of said multiplier.

16. The fluorescent detecting apparatus as claimed in claim 15, wherein the two signals supplied to said multiplier are controlled to have a substantially equal amplitude.

* * * * *